Dec. 16, 1958          H. L. EATON          2,864,431
SWING-OUT ELEVATING SEAT FOR AUTOMOBILES
Filed April 20, 1956          2 Sheets-Sheet 1
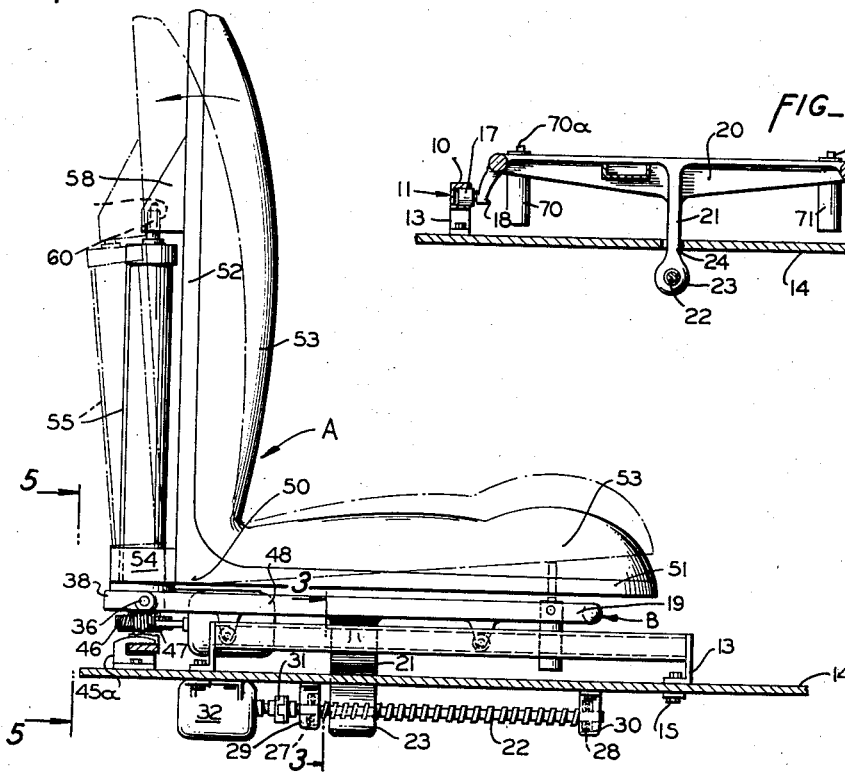
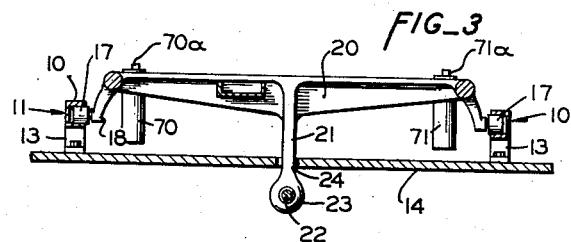
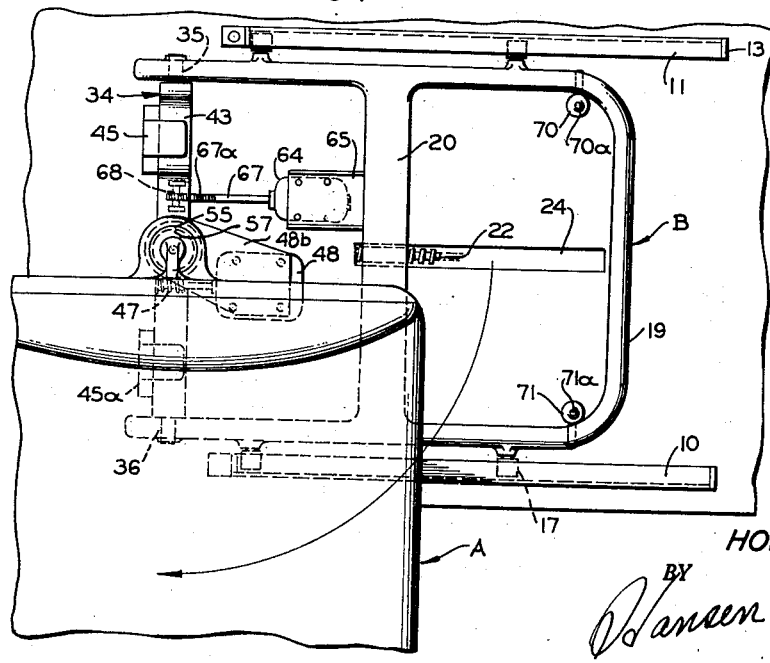
INVENTOR.
HOWARD L. EATON
ATTORNEYS

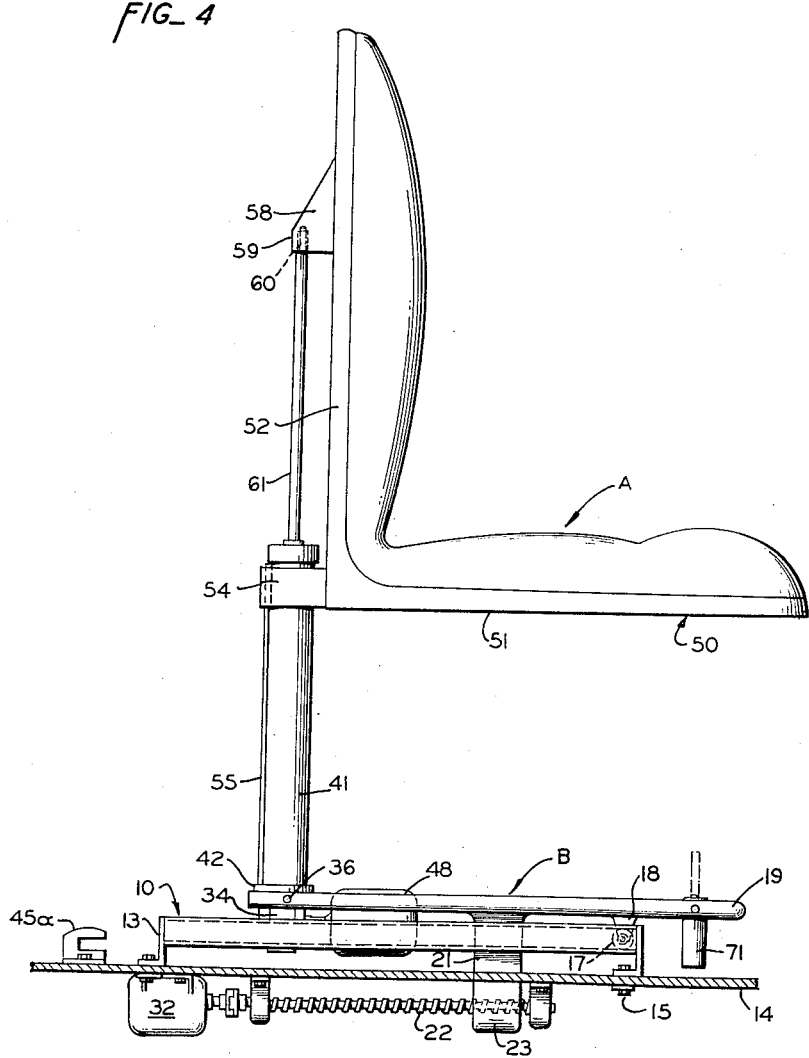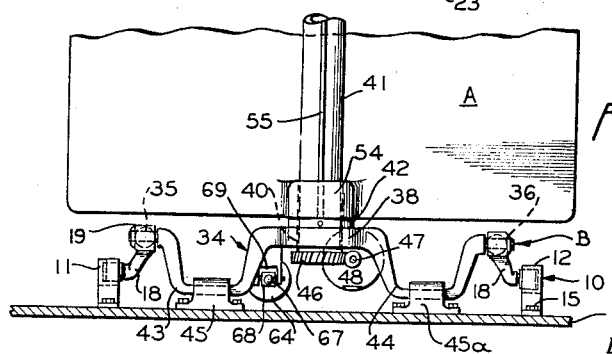

United States Patent Office 2,864,431
Patented Dec. 16, 1958

2,864,431

SWING-OUT ELEVATING SEAT FOR AUTOMOBILES

Howard L. Eaton, San Jose, Calif.

Application April 20, 1956, Serial No. 579,666

8 Claims. (Cl. 155—14)

The present invention pertains to a seat, and more particularly to an adjustable, swing-out, elevating type seat for low slung automobiles of the sports type.

In high performance automobiles, in order to provide satisfactory cornering ability, it is necessary to have a relatively low center of gravity. This is particularly important with respect to the seats, since the weight supported in the seats is variable with the number and size of passengers occupying them. If the seats are substantially above the axles or wheel spindles, the cornering ability of the automobile will vary with the number and weight of the passengers. For this reason, most high performance automobiles have their seats set quite close to the floor.

While this is a satisfactory arrangement as far as center of gravity and riding comfort of the passengers is concerned, it does make ingress and egress rather difficult, particularly in the case of older or less agile persons.

The present invention contemplates the provision of an automobile seat which may be moved longitudinally of the automobile to a position which will provide free clearance for swinging the legs in or out, and will then swing the seat outboard and will elevate it to a position from which it is easy to enter or leave it.

The invention also provides an automobile seat mounted for power driven adjustment fore and aft of the automobile, with power means for swinging the seat outboard and inboard and for tilting the seat to further adjusted position.

A further object of the invention is to provide an improved seat structure for automotive vehicles.

These and other objects and advantages of the invention will be apparent from the following description and the accompanying drawings, wherein Fig. 1 is a side elevational view of a seat embodying the invention, the seat being shown in lowered, forwardly facing, upright condition at its rearward limit of adjustment in solid lines, and in rearwardly tilted condition in broken lines.

Fig. 2 is a fragmentary plan view of the assembly shown in Fig. 1, the seat being shown in its upright, outwardly swung condition, portions being broken away.

Fig. 3 is a fragmentary sectional view taken along line 3—3 of Fig. 1.

Fig. 4 is a side elevational view of the seat adjusted forwardly of its position shown in Figs. 1 and 2, and with the seat in upright, elevated condition.

Fig. 5 is a fragmentary sectional view taken along line 5—5 of Fig. 1, portions beneath the floor being omitted.

Briefly, the invention comprises an automobile seat A mounted on a forwardly and rearwardly rolling carriage B for controlling tilting adjustment, for selective elevating and lowering, and for swinging from a straight ahead position as shown in Fig. 1 to an outwardly swung position as shown in Fig. 2.

Referring to the details of the invention, a pair of seat mounting tracks 10 and 11 are mounted parallel to each other. Each track has an inwardly facing, channeled track portion 12 with integral end brackets 13 thereon, the latter being secured to the floor 14 of the passenger compartment of the automobile (not shown) by bolts 15 passing through the end brackets. The track channel portions 12 are of a size to receive rollers 17 journaled on downwardly extending arms 18 formed in longitudinally spaced relation on each side of a generally U-shape frame 19 of the carriage B. The carriage frame 19 preferably is a forging of suitable steel or other alloy with an integral, transverse bar portion 20 located substantially medially of its length.

A bearing post 21 for threadedly receiving a longitudinal seat adjusting screw 22 is affixed centrally to the under side of the transverse frame bar 20 and extends downwardly therefrom. An internally threaded boss 23 is formed on the lower end of the post 21, preferably below the floor 14. A slot 24 in the floor 14 allows free fore-and-aft movement of the post 21 therein.

The longitudinal seat adjusting screw 22 is journaled in a pair of axially aligned thrust bearings 27 and 28 to resist endwise displacement in either direction. The bearings 27 and 28 are mounted in brackets 29 and 30, respectively, secured to the under side of the floor 14. A conventional drive coupling 31 connects the longitudinal adjusting screw 22 to a reversible, seat-adjusting motor 32. If desired, this may be a conventional gear reduction type motor.

A tiltable seat support member 34 (Figs. 2 and 5), having somewhat the appearance of a two-throw engine crank shaft with both throws offset in the same direction, is pivotally mounted on a pair of axially extending trunnion end studs 35 and 36 which are journaled in the rear ends of the sides of the carriage frame 19. The trunnioned seat support member 34 preferably is a forging of suitable metal, and has an annular central bearing portion 38 in which is journaled a bearing sleeve 40 surrounding and secured to the lower end of a seat elevating cylinder 41. A flange 42 is formed around the upper end of the sleeve 40 to overlie the annular bearing portion 38 and thus to support the sleeve 40 and the cylinder 41 secured therein against downward displacement.

A pair of downwardly offset throws 43 and 44 are formed in the trunnioned seat support member 34, one on each side of the central cylinder bearing portion 38. A pair of forwardly facing hooks 45 and 45a are secured to the floor 14 in position to engage the throws 43 and 44, respectively, at the rearward limit of travel of the carriage B.

A worm gear 46 is secured to the cylinder mounting sleeve 40 directly below the annular central bearing portion 38 of the tiltable seat support member 34 and bears against the underside of the latter to prevent upward axial displacement of the sleeve 40 relative to the annular bearing portion 38.

A worm pinion 47 on the shaft 48a of a reversible electric motor 48 is in driving engagement with the worm gear 46 for turning the cylinder 41 and the seat A supported thereon between the positions thereof shown in Fig. 1 and in Fig. 2.

The motor 48 is mounted on a bracket 48b (Fig. 2) which in turn is secured to the central bearing portion 38 of the tiltable seat support member 34.

The seat A comprises a frame 50 with a generally horizontal base portion 51 and an upright back portion 52. The seat A also is provided with suitable upholstery 53.

A bearing bracket 54 is rigidly secured to the seat frame 50 and extends rearwardly from the lower portion thereof. The bracket 54 has axially slidable bearing support on the cylinder 41, but is retained against relative turning movement thereon by a key 55 which extends lengthwise of the cylinder 41, and rides in a correspondingly shaped keyway 57 (Fig. 2) in the bearing bracket 54.

A rearwardly extending bracket 58 is provided medially of the upper portion of the seat back 52, and has a downwardly open socket 59 therein in which is fitted a stud 60 formed on the upper end of the piston rod 61 of the hydraulic cylinder 41. Thus, the seat A is mounted on the rotatable cylinder 41 for turning movement therewith, and may be raised and lowered by actuation of the cylinder between the positions shown in Figs. 1 and 4.

It is contemplated that the seat A will be swung outwardly to its position of Fig. 2, or inwardly to its position of Fig. 1 in its fully elevated condition, since in that condition the legs of a person occupying the seat may be moved more easily to clear the door opening of the automobile adjacent which the seat is mounted.

Means for tiltably adjusting the seat A comprise a motor 64 mounted on a bracket 65, the latter being secured to the under side of the seat carriage B. The shaft 67 of the motor 64 is threaded at 67a and is screwed into an internally threaded block 68 trunnioned in a notch 69 (Figs. 4 and 5) formed at one side of the downwardly extending throw 43 of the trunnioned seat support member 34. For assisting in tiltably adjusting the seat A, or for doing so independently of the motor 64 if desired, a pair of small hydraulic cylinders 70 and 71 are mounted in axially upright position on the front end of the carriage B with their piston rods 70a and 71a respectively bearing against the under side of the base portion 51 of the seat frame 50. These cylinders, as well as the seat elevating cylinder 40, may be actuated by means of conventional valve means (not shown) controlling the flow of hydraulic fluid or compressed air to and from the cylinders in a usual manner. Also, the electric motors 32, 48 and 64 may be operated by conventional switch controlled electrical circuits (not shown). Such circuits and valves are well known, and since they form no part of the present invention, they are not illustrated or described in detail herein.

Operation of the seat A is as follows:

It will be assumed that the seat A is in its lowered, upright, in-swung, solid line position of Fig. 1, with an occupant (not shown) seated therein. Fore-and-aft adjustment of the seat A may be accomplished by means of the reversible electric motor 32, which turns the adjusting screw 22 in a selected direction to move the seat carriage B and the parts mounted thereon forwardly or rearwardly as desired.

For tilting the seat A forwardly or rearwardly about the trunnion studs 45 as an axis, the electric motor 64 may be driven in a selected direction to screw the shaft 67 into or out of the trunnioned block 68, thereby tilting the rear seat support member 34, and the cylinder 41 and seat A thereon, forwardly or rearwardly to desired adjusted position.

The small hydraulic cylinders 70 and 71 at the forward end of the carriage frame 19 may be used either in conjunction with, or instead of, the tilt-adjusting motor 64.

When the occupant of the seat (not shown) desires to alight from the automobile, the carriage B preferably is first run rearwardly on its tracks by actuation of the longitudinal seat adjusting motor 32 to its extreme rear limit of movement as shown in Fig. 1, thereby bringing the throws 43 and 44 of the seat supporting member 34 into the floor hooks 45a and 45. These hooks fit sufficiently loosely on the crank throws to permit required tilting adjustment of the seat support member 34 without binding. The seat A then may be elevated by actuation of the hydraulic cylinder 41 to its position shown in Fig. 4, in which position the legs of the occupant may be easily drawn in to clear the door opening when the seat is swung outwardly. The seat rotating motor 48 then may be energized to drive the worm pinion 47 in a predetermined direction, and through it the worm gear 46 and the seat supporting hydraulic cylinder 41 with the seat A keyed thereto, thereby swinging the seat A outwardly to the position illustrated in Fig. 2. In this position the occupant may lower his feet to the ground and arise from the seat which is then at a convenient height for doing so.

In entering the automobile the operation described in the preceding paragraphs is reversed, the person first seating himself in the elevated, outswung seat A, then drawing his legs upwardly and his feet inwardly to a position which will allow them to clear the door opening. The motor 48 then is energized to swing the seat A inwardly to its fore-and-aft position, after which the seat A may be lowered by means of the hydraulic cylinder 41 to its solid line position of Fig. 1. The seat then may be run forwardly on the tracks 10 and 11 to desired adjusted position by energizing the motor 32, and may be tilted as required by the motor 64 and/or the small hydraulic cylinders 70 and 71.

The invention provides an easily and fully adjustable swing-out type seat for low-slung, high-performance automobiles, and one which greatly facilitates entering and leaving such automobiles.

While I have illustrated and described a preferred embodiment of the present invention, it will be understood however, that various changes and modifications may be made in the details thereof without departing from the scope of the invention as set forth in the appended claims.

Having thus described the invention, what I claim as new and desire to protect by Letters Patent is defined in the following claims.

I claim:

1. A swing-out elevating type seat for an automobile comprising a track extending lengthwise of the passenger compartment of an automobile, a carriage mounted for limited movement lengthwise along the track, reversible drive means controlling movement of the carriage along the track, a seat support member pivotally mounted on the carriage for tiltable movement about an axis extending transversely of the carriage, power drive means interconnecting the carriage and the tiltable seat support member for adjusting the tilt angle of the latter, axially extensible seat elevating means mounted on the seat support member with its axis of extension at right angles to the pivotal axis of the seat support member, said seat elevating means being rotatable about its axis of extension relative to the tiltable seat support member, means controlling the extension and retraction of the seat elevating means, a seat mounted for movement on the seat elevating means and connected thereto for movement lengthwise of the axis of extension of the seat elevating means, guide means retaining the seat against rotative movement relative to the seat elevating means, and reversible drive means interconnecting the tiltable seat support and the extensible member for controlling pivotal adjustment of the extensible member and the seat supported thereon.

2. A swing-out elevating type seat for an automobile comprising track means mounted lengthwise of the floor of the passenger compartment of an automobile, a carriage mounted for limited movement lengthwise along the track means, reversible drive means controlling movement of the carriage along the track means, a seat support member pivotally mounted on the carriage for tiltable movement about an axis extending transversely of the carriage, a downwardly extending crank throw formed in the tiltable seat support member, hook means mounted on the floor to engage the crank throw at the rearward limit of carriage movement, power drive means interconnecting the crank throw and the carriage for adjusting the tilt angle of the tiltable seat support member, axially extensible seat elevating means rotatably mounted on the seat support member with the axis of extension of the elevating means extending upwardly, a seat mounted for movement on the seat elevating means and connected thereto for movement lengthwise of the axis of extension of the seat elevating means upon actuation of the latter, and guide means retaining the seat against rotative movement relative to the seat elevating means.

3. A swing-out elevating type seat for an automobile comprising a track extending lengthwise of the passenger compartment of an automobile, a carriage mounted for limited movement lengthwise along the track, reversible drive means for controlling movement of the carriage along the track, axially extensible seat elevating means pivotally mounted on the carriage member with its axis of extension directed generally upwardly, said seat elevating means being rotatable about its axis of extension relative to the carriage, means controlling the extension and retraction of the seat elevating means, a seat mounted for movement on the seat elevating means and connected thereto for movement lengthwise of the axis of extension of the seat elevating means, guide means retaining the seat against rotative movement relative to the seat elevating means, and reversible drive means operatively interconnecting the seat elevating means and the carriage for controlling rotative adjustment of the seat elevating means and the seat supported thereon.

4. A swing-out, elevating type automobile seat for mounting on the floor of a passenger compartment of an automobile comprising a longitudinally extending track, a seat support carriage mounted for fore-and-aft movement on said track, longitudinally extending screw means interconnecting the floor and the carriage, reversible drive means operatively connected to said screw means for selectively controlling movement of the carriage back and forth along said track, a seat support member trunnioned transversely of the rear end of the carriage, a hydraulic cylinder mounted in said seat support member for rotative movement about an axis normal to the trunnion axis of the seat support member, and extending generally upwardly therefrom, a seat mounted for slidable movement axially of the cylinder, guide means retaining the seat against rotative movement relative to the cylinder, a piston rod mounted in the cylinder for selective extension and retraction upwardly therefrom, means connecting the upper end of the piston rod to the seat, drive means interconnecting the seat support member and the carriage for controlling the tilt angle of the cylinder and seat relative to the carriage, and reversible drive means operatively connecting the trunnioned seat support and the cylinder for rotating the cylinder and the seat supported thereon through an angle of approximately 90° from a forwardly facing position of the seat to a laterally outwardly facing position of the seat.

5. An arrangement according to claim 4 wherein the seat rotating means comprises a worm gear mounted coaxially on the lower end of the cylinder, a worm pinion in driving connection with worm gear, and a reversible motor is mounted on the trunnioned seat support and is in driving engagement with the worm pinion.

6. An automobile seat comprising a track mounted lengthwise of a passenger compartment of an automobile, a seat support carriage mounted for movement along said track, means for selectively controlling movement of the carriage back and forth along said track, a seat support member trunnioned between rear portions of the carriage, a non-circular element secured to the seat support member, a seat mounted on the seat support member, adjusting means acting between the seat and the seat support for vertically adjusting the seat, drive means interconnecting the seat support member and the carriage for controlling the tilt angle of the seat support member and seat relative to the carriage, and non-circular locking means secured relative to the tracks, and formed and positioned to interfit with the non-circular element secured to the seat support member in a predetermined position of the carriage along the track.

7. An automobile seat comprising a track mounted lengthwise of a passenger compartment of an automobile, a seat support carriage mounted for movement along said track, means for selectively controlling movement of the carriage back and forth along said track, a seat support member trunnioned between rear portions of the carriage, a non-circular element secured to the seat support member, a seat mounted on the seat support member, adjusting means acting between the seat and the seat support for vertically adjusting the seat, a power driven extensible member mounted between the carriage and the seat at the forward end of the carriage, drive means interconnecting the seat support member and the carriage for controlling the tilt angle of the seat support member and seat relative to the carriage, means for extending the power driven extensible member with the seat in a predetermined vertically adjusted condition to aid in tilting the seat on its trunnions, and non-circular locking means secured relative to the track, and formed and positioned to interfit with the non-circular element secured to the seat support member in a predetermined position of the carriage along the track.

8. An arrangement according to claim 7 wherein the power driven extensible member is a hydraulic cylinder mounted in axially upright condition and engaging the under side of the seat.

References Cited in the file of this patent

UNITED STATES PATENTS

| | | |
|---|---|---|
| 1,700,088 | Smith et al. | Jan. 22, 1929 |
| 2,383,173 | Watter | Aug. 21, 1945 |
| 2,442,303 | Mayfield | May 25, 1948 |
| 2,679,890 | Zannoth | June 1, 1954 |

FOREIGN PATENTS

| | | |
|---|---|---|
| 518,018 | Great Britain | Feb. 15, 1940 |